(12) United States Patent
Shin et al.

(10) Patent No.: US 11,054,657 B2
(45) Date of Patent: Jul. 6, 2021

(54) SEE-THROUGH DISPLAY DEVICE

(71) Applicant: SAMSUNG ELECTRONICS CO., LTD., Suwon-si (KR)

(72) Inventors: Bongsu Shin, Seoul (KR); Changkun Lee, Seoul (KR); Sunil Kim, Seoul (KR); Wontaek Seo, Yongin-si (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 16/364,333

(22) Filed: Mar. 26, 2019

(65) Prior Publication Data

US 2020/0125227 A1 Apr. 23, 2020

(30) Foreign Application Priority Data

Oct. 22, 2018 (KR) .................. 10-2018-0126314

(51) Int. Cl.
*G02B 6/122* (2006.01)
*G06F 3/01* (2006.01)
(Continued)

(52) U.S. Cl.
CPC ........ *G02B 27/0179* (2013.01); *G06T 19/006* (2013.01); *G02B 27/0172* (2013.01); *G02B 2006/1215* (2013.01); *G06F 1/163* (2013.01); *G06F 3/011* (2013.01); *G06F 3/0487* (2013.01); *G06F 2203/04804* (2013.01)

(58) Field of Classification Search
CPC ............ G02B 27/0179; G02B 27/0172; G02B 2006/1215; G02B 27/017; G02B 2027/0134; G02B 2027/0132; G02B 2027/013; G02B 2027/0136; G02B 27/0101; G02B 27/01; G02B 27/00; G02B 2006/12133; G02B 6/12; G02B 6/0001; G02B 6/00; G06T 19/006; G06T 19/00; G06F 1/163; G06F 3/011; G06F 3/0487; G06F 2203/04804; G06F 1/1613; G06F 1/16; G06F 1/00; G06F 3/01; G06F 3/048; G06F 3/03; G06F 3/002; G06F 3/005; G06F 3/00; G06F 2203/048; G06F 2203/00

See application file for complete search history.

(56) References Cited

U.S. PATENT DOCUMENTS 9,769,465 B2 9/2017 Seo et al.
9,864,201 B2 1/2018 Kim et al.
(Continued)

FOREIGN PATENT DOCUMENTS

JP 06115381 A * 4/1994
KR 10-0351805 B1 9/2002
(Continued)

*Primary Examiner* — Julie Anne Watko
(74) *Attorney, Agent, or Firm* — Sughrue Mion, PLLC

(57) ABSTRACT

A see-through display device includes an image generation unit configured to emit a virtual image light, a light combining unit configured to combine the virtual image light with an actual image light, and a driving unit including a deformation unit and a bridge unit disposed between the deformation unit and the image generation unit, and configured to control a distance between the image generation unit and the light combining unit through the deformation unit and the bridge unit.

13 Claims, 12 Drawing Sheets

(51) Int. Cl.
*G02B 27/01* (2006.01)
*G06T 19/00* (2011.01)
*G06F 1/16* (2006.01)
*G06F 3/0487* (2013.01)
*G02B 6/12* (2006.01)

(56) References Cited

U.S. PATENT DOCUMENTS

2009/0160736 A1* 6/2009 Shikita ............... G02B 27/0101
   345/7
2013/0088413 A1  4/2013 Raffle et al.
2016/0313558 A1  10/2016 Gutierrez
2017/0299945 A1  10/2017 Suzuki et al.
2017/0357088 A1* 12/2017 Matsuzaki ............. B60K 35/00
2020/0096816 A1  3/2020 Lee et al.
2020/0326541 A1* 10/2020 Schoch .................. B60K 35/00

FOREIGN PATENT DOCUMENTS

KR   10-2003-0073884 A   9/2003
KR   10-2015-0093054 A   8/2015
KR   10-2016-0068060 A   6/2016

* cited by examiner

SEE-THROUGH DISPLAY DEVICE

CROSS-REFERENCE TO RELATED APPLICATION

This application claims priority from Korean Patent Application No. 10-2018-0126314, filed on Oct. 22, 2018 in the Korean Intellectual Property Office, the disclosure of which is incorporated herein by reference in its entirety.

BACKGROUND

1. Field

Apparatuses and methods consistent with exemplary embodiments relate to see-through display devices.

2. Description of the Related Art

Recently, as the development of electronic and display devices that may realize virtual reality (VR), interests with respect to VR have increased. As a next step of VR, technologies (methods) that may realize augmented reality (AR) and mixed reality (MR) have been studied.

Unlike VR that premises a complete virtual world, AR is a display technique that further increases an effect of reality by overlapping (combining) imaginal objects or information on an environment of the real world. Considering that VR is limitedly applicable to a field, such as games or virtual experiences, AR may be applicable to various real environments. In particular, AR draws attention as a next generation display technique suitable for a ubiquitous environment or an internet of things (IoT) environment. AR may be an example of MR in that AR mixes the real world and additional information (virtual world).

SUMMARY

One or more exemplary embodiments provide miniaturized and lightweight see-through display devices.

One or more exemplary embodiments provide see-through display devices configured to continuously change a focal distance thereof.

According to an aspect of an example embodiment, there is provided a see-through display device including: an image generation unit configured to emit virtual image light; a light combining unit configured to combine the virtual image light and actual image light; and a driving unit including a deformation unit and a bridge unit disposed between the deformation unit and the image generation unit, and configured to control a distance between the image generation unit and the light combining unit through the deformation unit and the bridge unit.

A length of the deformation unit may change according to a temperature of the deformation unit.

The driving unit may further include a driving control unit that controls the deformation unit, and the driving control unit may control the temperature of the deformation unit by applying an electrical signal.

As the length of the deformation unit decreases, the bridge unit may move the image generation unit closer to the light combining unit to decrease the distance between the image generation unit and the light combining unit.

The deformation unit may include a shape memory alloy (SMA).

The deformation unit may be wound around both edges of the bridge unit so that the bridge unit has an arch shape.

The bridge unit may have elasticity.

The both edges of the bridge unit may include recess regions, and the deformation unit may be wound around the recess regions.

According to an aspect of another example embodiment, there is provided a see-through display device including: an image generation unit configured to emit a virtual image light; a light combining unit configured to combine the virtual image light and an actual image light; and a driving unit including: a supporting unit; and a deformation unit disposed between the supporting unit and the image generation unit and configured to move the image generation unit closer to the light combining unit as a length of the deformation unit increases, wherein the driving unit may be configured to control a distance between the image generation unit and the light combining unit through the deformation unit and the supporting unit.

The driving unit may further include a driving control unit configured to control the deformation unit, and the driving control unit may control the length of the deformation unit by applying an electrical signal to the deformation unit.

The length of the deformation unit may be changed according to a temperature of the deformation unit, and the temperature of the deformation unit may be controlled by the electrical signal.

The see-through display device may further include a restoration unit provided between the supporting unit and the image generation unit, and the restoration unit may have a characteristic of returning to an initial state when the restoration unit is deformed.

The restoration unit may include a bar having elasticity, and both edges of the bar respectively may contact the supporting unit and the image generation unit.

The bar may be provided a pair of torsion springs, and the pair of bars may extend in a direction crossing each other.

The restoration unit may include a torsion spring, and both edges of the torsion spring respectively may contact the supporting unit and the image generation unit.

The torsion spring may be provided a pair, and the pair of torsion springs may face each other with the supporting unit and the image generation unit therebetween.

According to an aspect of another example embodiment, there is provided a see-through display device including: an image generation unit configured to emit virtual image light; a light combining unit configured to form a virtual image based on the virtual image light; a deformation unit configured to control a distance between the virtual image and the light combining unit; and a driving control unit configured to control a length of the deformation unit to adjust the distance between the virtual image and the light combining unit.

The driving control unit may increase the distance between the virtual image and the light combining unit by reducing the length of the deformation unit.

The see-through display device may further include a bridge unit disposed between the deformation unit and the image generation unit, wherein as the length of the deformation unit decreases, the bridge unit moves the image generation unit closer to the light combining unit, and as the image generation unit is disposed closer to the light combining unit, the distance between the virtual image and the light combining unit 300 is increased.

The driving control unit may increase the distance between the virtual image and the light combining unit by increasing the length of the deformation unit.

The see-through display device may further include: a supporting unit spaced apart from the image generation unit with the deformation unit that is disposed between the supporting unit and the image generation unit; and a restoration unit arranged between the supporting unit and the image generation unit, wherein as the length of the deformation unit increases, the image generation unit is disposed closer to the light combining unit, and as the image generation unit is disposed closer to the light combining unit, the distance between the virtual image and the light combining unit is increased.

BRIEF DESCRIPTION OF THE DRAWINGS

The above and/or other aspects will be more apparent by describing certain example embodiments, with reference to the accompanying drawings in which.

DETAILED DESCRIPTION

Figure 1:
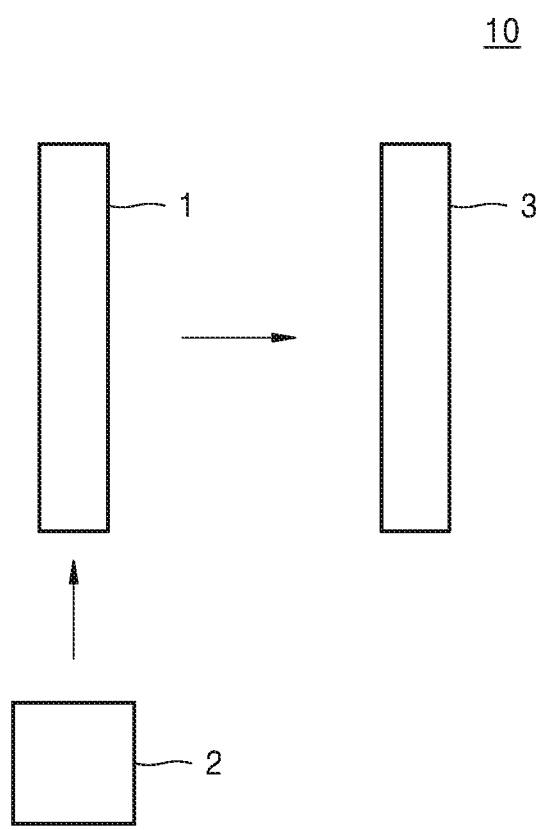
FIG. 1 is a block diagram of a see-through display device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will also be understood that when an element is referred to as being "on" or "above" another element, the element may be in direct contact with the other element or other intervening elements may be present.

In the following embodiments, the singular forms include the plural forms unless the context clearly indicates otherwise. It should be understood that, when a part "comprises" or "includes" an element in the specification, unless otherwise defined, other elements are not excluded from the part and the part may further include other elements.

Also, in the specification, the term "units" or " . . . modules" denote units or modules that process at least one function or operation, and may be realized by hardware, software, or a combination of hardware and software.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a block diagram of a see-through display device 10 according to an example embodiment.

Referring to FIG. 1, the see-through display device 10 including an image generation unit 1, a driving unit 2, and a light combining unit 3 may be provided. The term "see-through display device" may be also referred to as "transparent display device." The see-through display device 10 may be a device that combines actual image light with virtual image light and provides the combined light to a user. The actual image light may be light that is emitted from an actual object and includes image information with respect to the actual object. The virtual image light may be light that is emitted from, for example, a display device, such as a spatial light modulator (SLM) and includes required virtual image information.

The image generation unit 1 may emit virtual image light. For example, the image generation unit 1 may include a liquid crystal on silicon (LCoS). The driving unit 2 may control a location of the image generation unit 1. For example, the driving unit 2 may adjust a location of the image generation unit 1 so that the image generation unit 1 may be placed close to the light combining unit 3 or away from the light combining unit 3. The light combining unit 3 may combine a virtual image with an actual image. For example, the light combining unit 3 may include a beam splitter.

Figure 2:
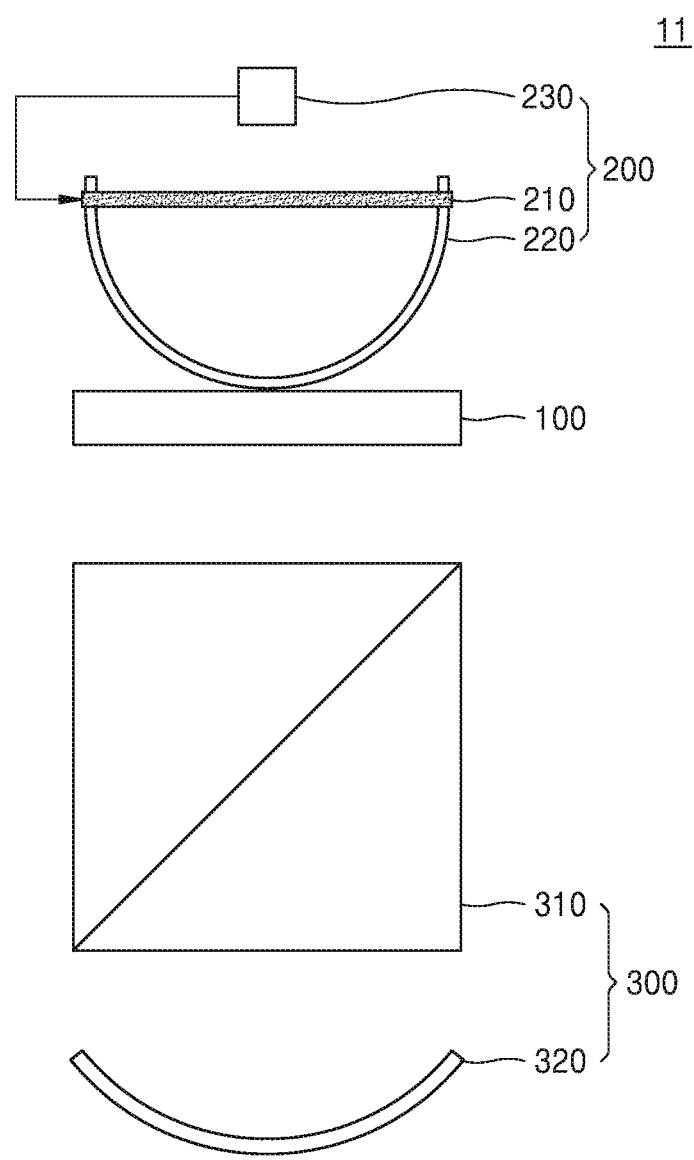
FIG. 2 is a conceptual drawing of a see-through display device according to an example embodiment.
Figure 3:
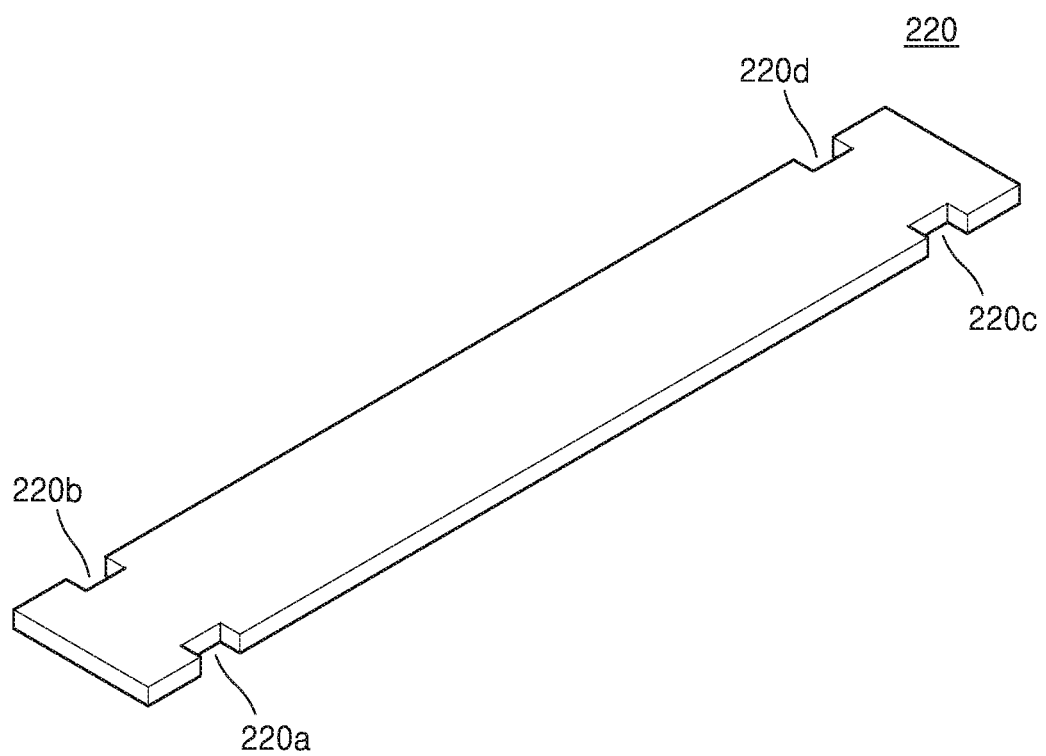
FIG. 3 is a perspective view of a bridge unit of FIG. 2.
Figure 4:
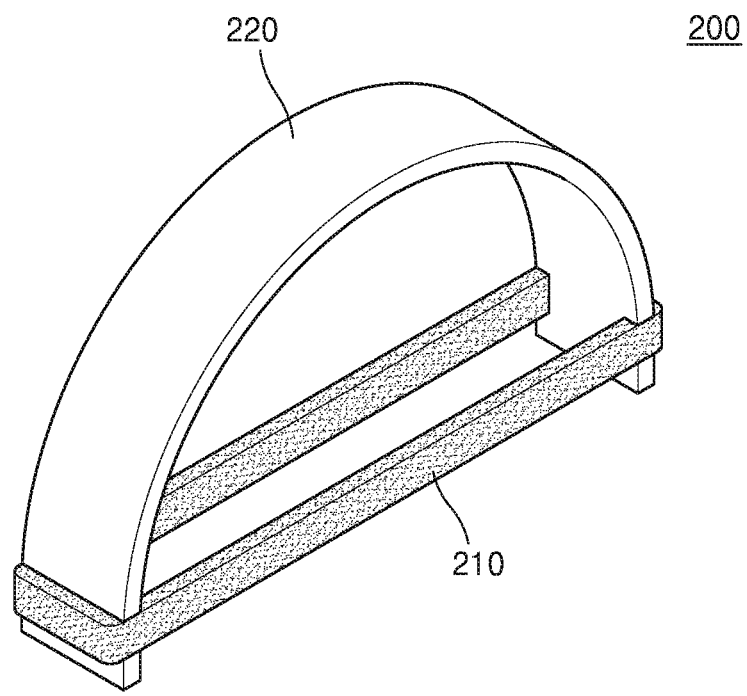
FIG. 4 is a perspective view of a driving unit of FIG. 2.

FIG. 2 is a conceptual drawing of a see-through display device 11 according to an example embodiment. FIG. 3 is a perspective view of a bridge unit 220 of FIG. 2. FIG. 4 is a perspective view of a driving unit 200 of FIG. 2.

Referring to FIGS. 2 through 4, the see-through display device 11 including an image generation unit 100, the driving unit 200, and a light combining unit 300 may be provided.

The image generation unit 100 may emit virtual image light. For example, the image generation unit 100 may include an LCoS and a light source. The image generation unit 100 may provide virtual image light to the light combining unit 300.

The driving unit 200 may control a location of the image generation unit 100. The driving unit 200 may include a first deformation unit 210, a bridge unit 220, and a driving control unit 230. The first deformation unit 210 may be of a wire type. A length of the first deformation unit 210 may vary according to a temperature of the first deformation unit 210 and an electric field formed in the first deformation unit 210. For example, the first deformation unit 210 may include a shape memory alloy (SMA), an electro-active polymer (EAP), and a combination of these materials. When the first deformation unit 210 includes an SMA, the first deformation unit 210 may have a relatively small length at a relatively high temperature and may have a relatively large length at a relatively low temperature. For example, the length of the first deformation unit 210 may increase as the temperature of the first deformation unit 210 decreases, and the length of the first deformation unit 210 may decrease as the temperature of the first deformation unit 210 increases. When the first deformation unit 210 includes an EAP, a length of the first deformation unit 210 may extend in a direction vertical to an electric field when the electric filed is applied to the first deformation unit 210. For convenience of explanation, hereinafter, the deformation of the first deformation unit 210 by temperature will be described.

The temperature of the first deformation unit 210 may be controlled by an electrical signal applied to the first deformation unit 210. The electrical signal may be applied by the driving control unit 230. The driving control unit 230 may include a voltage supply, a current supply, or a power supply to generate the electrical signal. The electrical signal may be a voltage signal or a current signal. For example, the temperature of the first deformation unit 210 may change according to a value of the voltage signal or the current signal that is applied to the first deformation unit 210. In an example embodiment, the temperature of the first deformation unit 210 may be increased by applying a voltage to the first deformation unit 210 by the driving control unit 230. When a voltage is not applied to the first deformation unit 210, the temperature of the first deformation unit 210 may be reduced. As such, the driving unit 200 may apply heat to the first deformation unit 210 by using an electrical signal, so that the temperature of the first deformation unit 210 may change as a result of the supply of heat.

The bridge unit 220 may be arranged between the first deformation unit 210 and the image generation unit 100. As depicted in FIGS. 3 and 4, the bridge unit 220 may include a plate type member extending in a direction. The bridge unit 220 may include recess regions 220a, 220b, 220c, and 220d facing each other on both edges in an extending direction. The recess regions 220a, 220b, 220c, and 220d may be used to fixate the first deformation unit 20 at the edges of the bridge unit 220, and may be also referred to as the term "depressions" or "grooves."

The bridge unit 220 may have elasticity. The bridge unit 220 may be of an arch type by bending by the first deformation unit 210. Edge units of the bridge unit 220 may be wound by the first deformation unit 210. The first deformation unit 210 may be wound around the recess regions 220a, 220b, 220c, and 220d of the edge units of the bridge unit 220. The recess regions 220a, 220b, 220c, and 220d may fix the first deformation unit 210 to the bridge unit 220. Accordingly, locations of the first deformation unit 210 and the bridge unit 220 may be arranged. The degree of bending of the bridge unit 220 may vary according to the length change of the first deformation unit 210. The term "degree of bending" may be also referred to as "degree of curve" or "degree of curvature." When the length of the first deformation unit 210 is reduced, the degree of bending of the bridge unit 220 may be increased. Accordingly, a distance between the image generation unit 100 and the light combining unit 300 may be reduced. When the length of the first deformation unit 210 is increased, the degree of bending of the bridge unit 220 may be reduced. Accordingly, the distance between the image generation unit 100 and the light combining unit 300 may be increased.

The light combining unit 300 may combine a virtual image with an actual image. The light combining unit 300 may include a light combining element 310 and a light focusing element 320. The light focusing element 320 may reflect and focus virtual image light incident to the light focusing element 320. For example, the light focusing element 320 may include a concave mirror, a convex lens, or a combination of the concave mirror and the convex lens. When the light focusing element 320 includes a convex lens, the light focusing element 320 may be disposed between the light combining element 310 and the image generation unit 100. For convenience of explanation, hereinafter, a case that the light focusing element 320 includes a concave lens will be described.

The image generation unit 100 may be arranged between the light focusing element 320 and a focal point of the light focusing element 320. Accordingly, a virtual image with respect to an image generated by the image generation unit 100 may be formed.

The light combining element 310 may reflect a portion of light incident to the light combining element 310 and may transmit the other portion thereof. For example, the light combining element 310 may include a cube beam splitter or a plate beam splitter. For convenience of explanation, it is depicted as that the light combining element 310 includes a cube beam splitter.

Various optical elements may further be disposed between the image generation unit 100 and the light combining unit 300. For example, optical elements for controlling a length of a light path may be disposed between the image generation unit 100 and the light combining unit 300.

Figure 5:
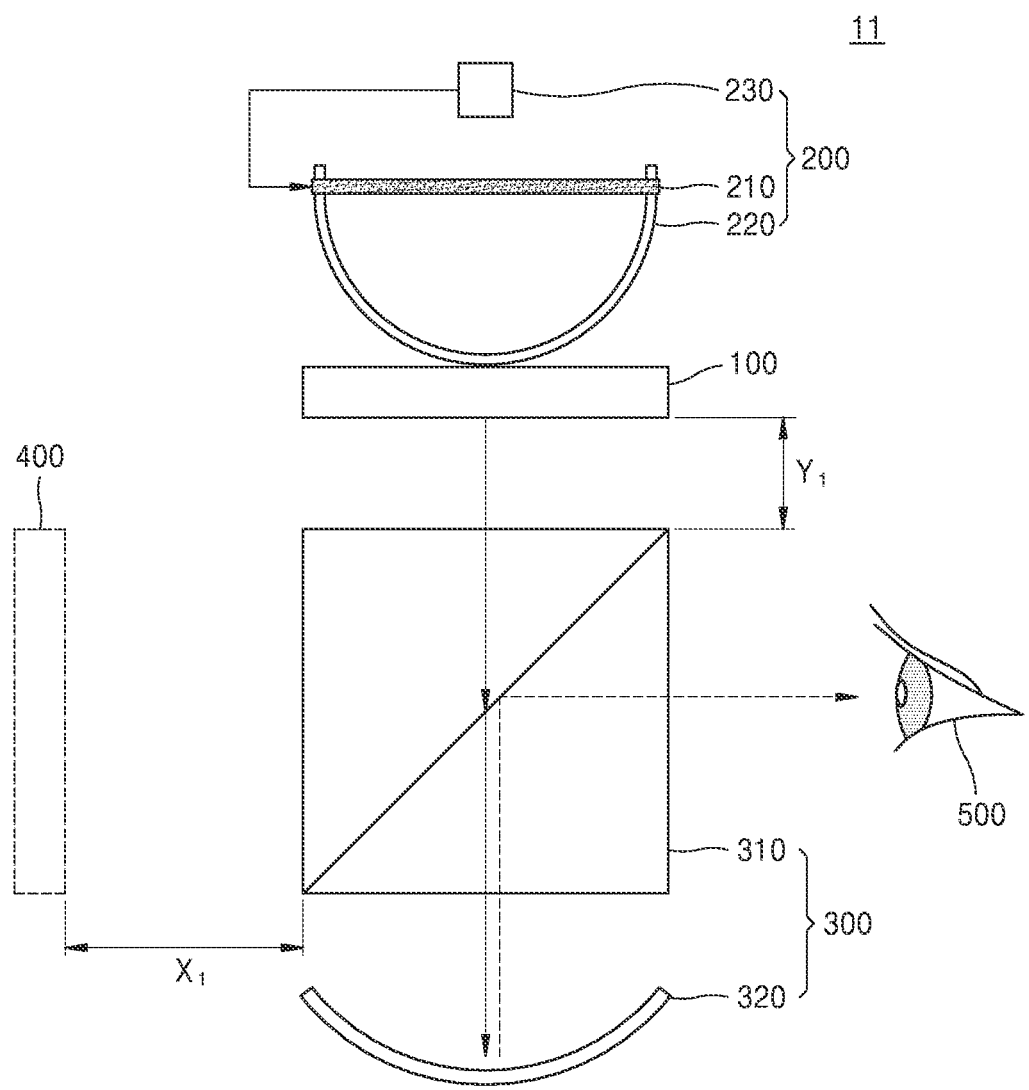
FIGS. 5 and 6 are conceptual drawings for explaining an operation of the see-through display device of FIG. 2.
Figure 6:
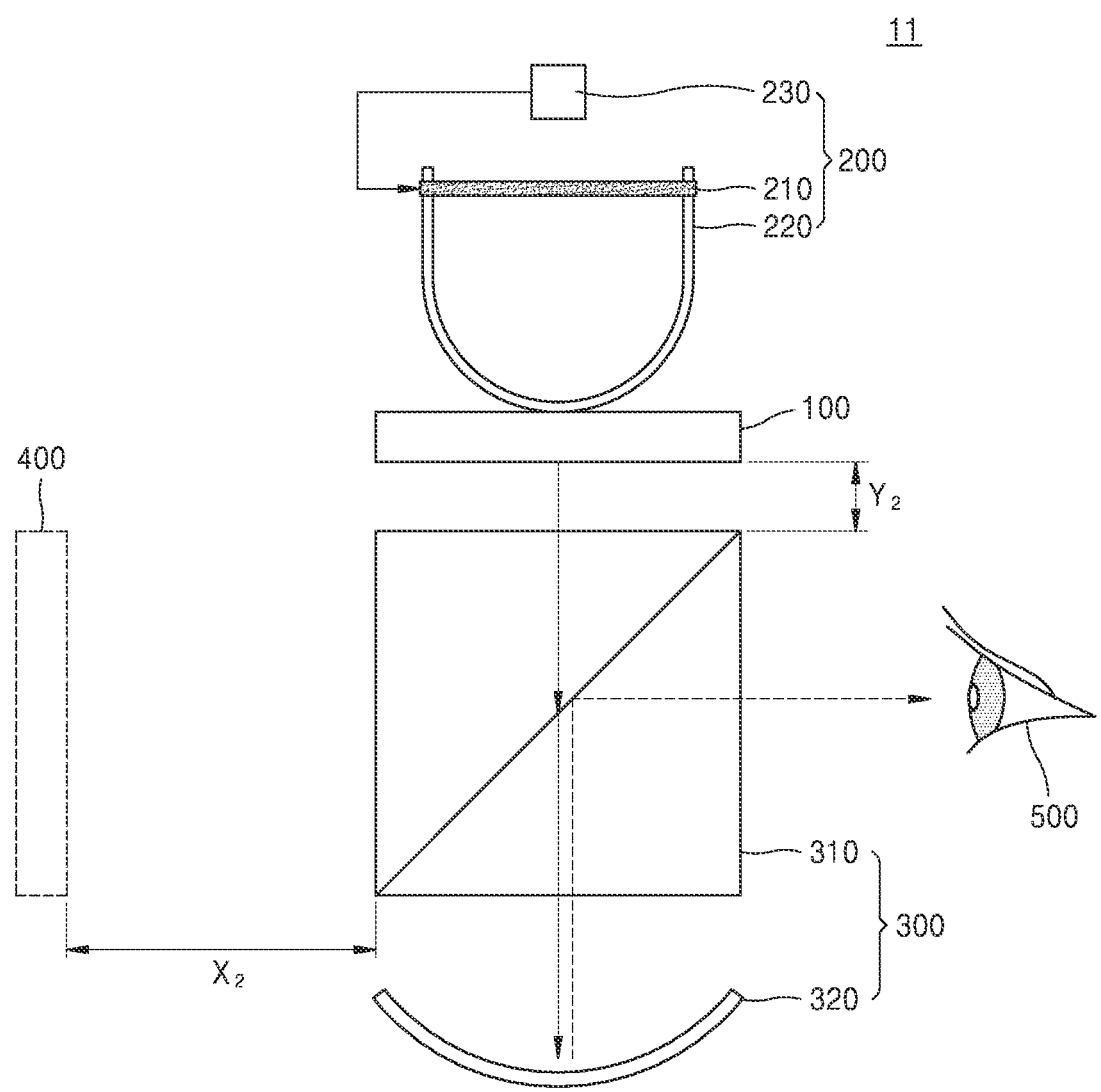

FIGS. 5 and 6 are conceptual drawings for explaining an operation of a see-through display device 11 of FIG. 2. For convenience of explanation, descriptions substantially identical to the descriptions made with reference to FIGS. 2 through 4 may be omitted.

In FIG. 5, the driving control unit 230 may not apply a voltage or a current to the first deformation unit 210, whereas the driving control unit 230 in FIG. 6 may apply a voltage or current to the first deformation unit 210.

With reference to FIG. 5, the image generation unit 100 may be spaced apart from the light combining element 310 as much as a distance $Y_1$. The image generation unit 100 may emit virtual image light. The virtual image light may transmit through the light combining element 310. A portion of the virtual image light may be reflected by the light combining element 310. The virtual image light that is transmitted through the light combining element 310 may reach the light focusing element 320.

The light focusing element 320 may generate reflected light by reflecting the virtual image light. The reflected light may be virtual image light reflected by the light focusing element 320. The reflected light may be reflected by the light combining element 310 and may be focused on the eyes of a user 500 of the see-through display device 11. Accordingly, the user 500 may observe a virtual image generated by the image generation unit 100. Although not shown, a portion of the reflected light may transmit through the light combining element 310.

The image generation unit 100 may be arranged between the light focusing element 320 and a focal point of the light focusing element 320. Accordingly, the light combining unit 300 may form a virtual image 400. The virtual image 400 may be spaced apart from the light combining element 310 as much as a distance $X_1$.

Referring to FIG. 6, a temperature of the first deformation unit 210 may be increased by applying a voltage to the first deformation unit 210. The voltage may be applied by the driving control unit 230. Accordingly, a length of the first deformation unit 210 may be reduced. The degree of length change of the first deformation unit 210 may be controlled by controlling the temperature of the first deformation unit 210.

The degree of bending of the bridge unit 220 may be increased. The bridge unit 220 may dispose the image generation unit 100 closer to the light combining unit 300 by pushing the image generation unit 100 toward the light combining element 310. The image generation unit 100 and the light combining element 310 may be spaced apart as much as a distance $Y_2$, which is less than the distance $Y_1$.

The virtual image 400 may move away from the light combining unit 300. The virtual image 400 may be spaced apart from the light combining element 310 as much as a distance $X_2$, which is greater than the distance $X_1$. In other words, the virtual image 400 in FIG. 6 may be projected at a position further far away from the light combining element 310, compared to the virtual image 400 in FIG. 5.

Once the driving control unit 230 stops applying a voltage to the first deformation unit 210, the temperature of the first deformation unit 210 may be reduced. The length of the first deformation unit 210 may be re-increased to the length as shown in FIG. 5. The degree of bending of the bridge unit 220 may be reduced. The image generation unit 100 may be moved away from the light combining unit 300. For example, the image generation unit 100 may move towards the light combining element 310 by a distance $Y_1$ from the light combining element 310. The virtual image 400 may be closer to the light combining unit 300. For example, the virtual image 400 and the light combining element 310 may be closer to each other by the distance $X_1$.

The present disclosure may provide the see-through display device 11 configured to control a location of the virtual image 400. The location of the virtual image 400 may be continuously changed.

Figure 7:
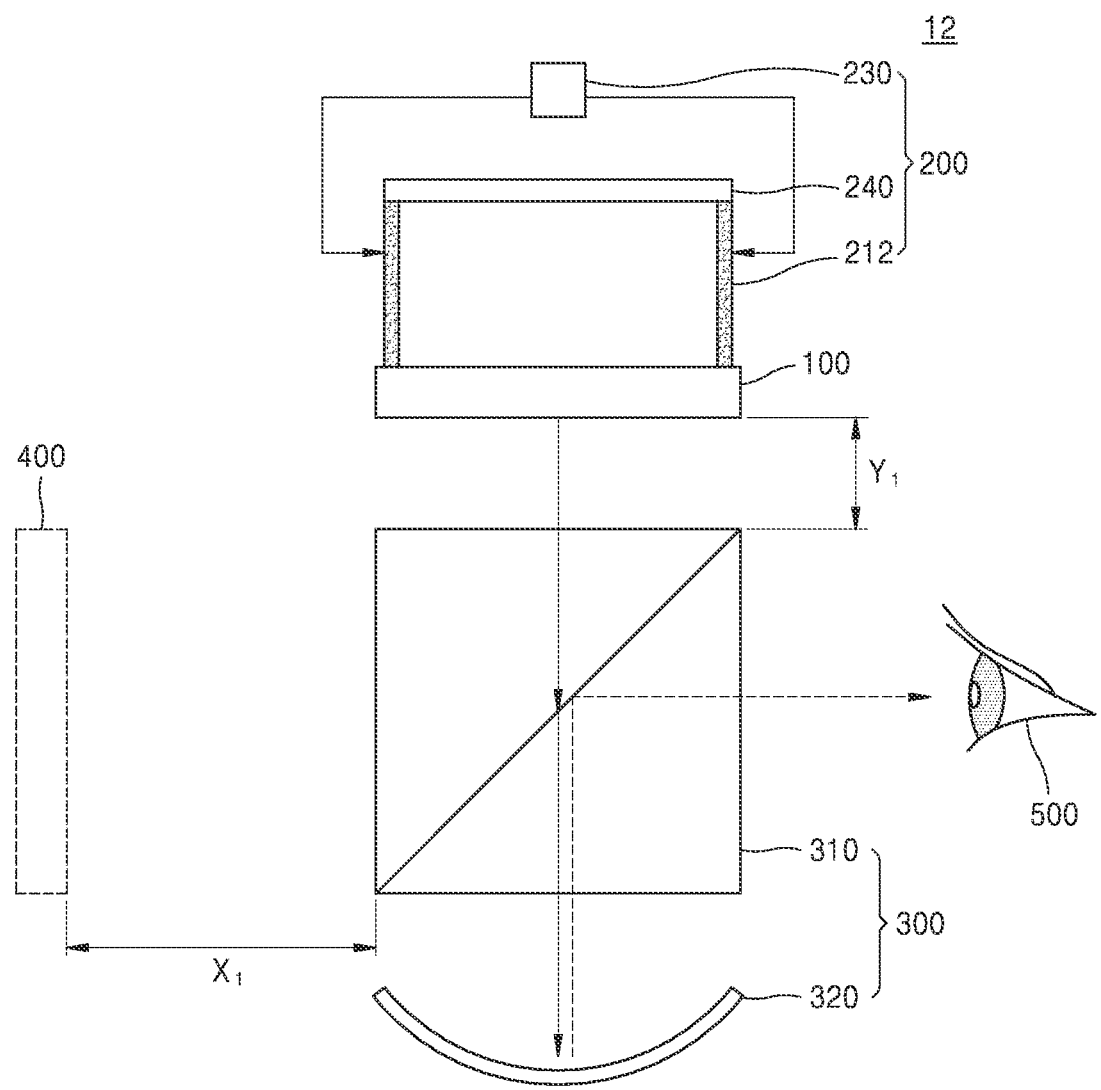
FIGS. 7 and 8 are conceptual drawings for explaining an operation of a see-through display device according to another example embodiment.
Figure 8:
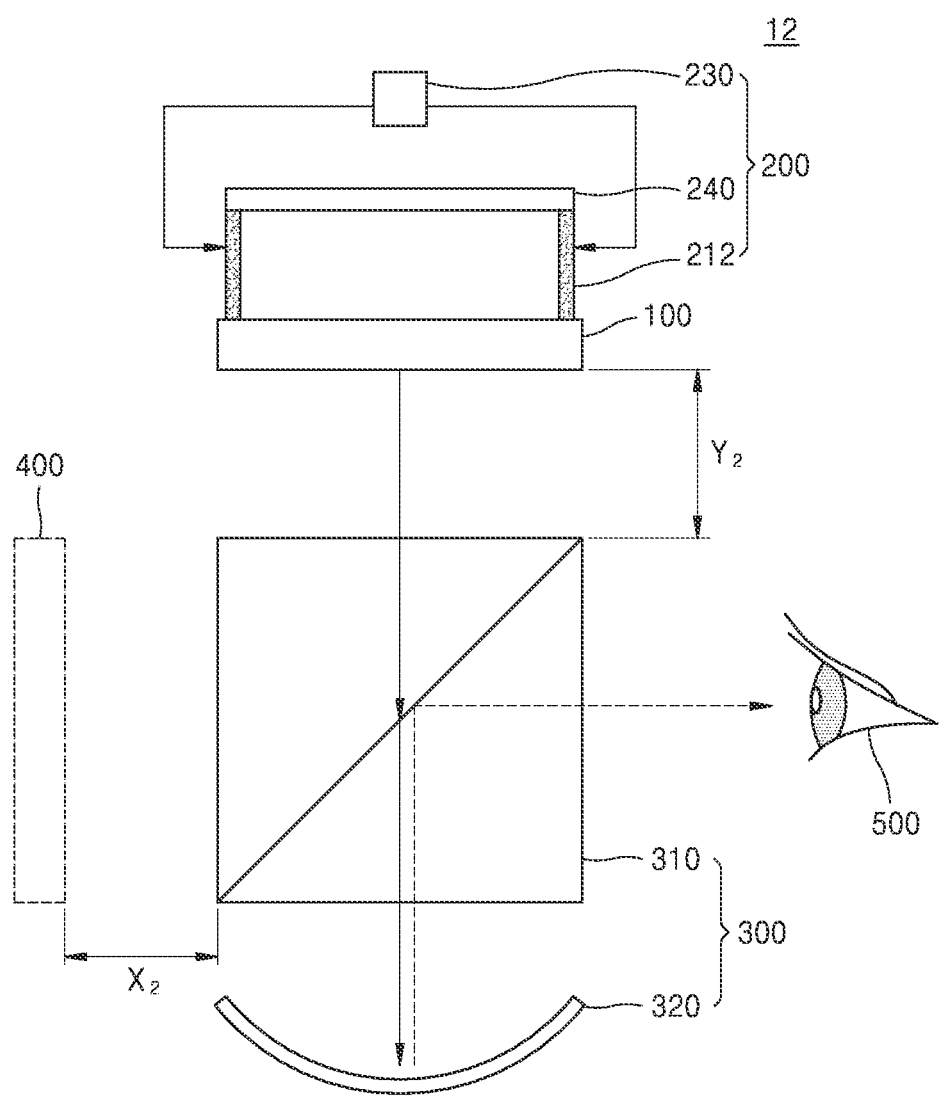

The present disclosure may provide the see-through display device 11 in which the driving unit 200 that moves the location of the image generation unit 100 is miniaturized and lightweight FIGS. 7 and 8 are conceptual drawings for explaining operations of a see-through display device 12 according to another example embodiment. For convenience of explanation, descriptions substantially identical to the descriptions made with reference to FIG. 2 will be omitted.

Referring to FIG. 7, the see-through display device 12 including an image generation unit 100, a driving unit 200, and a light combining unit 300 may be provided. The image generation unit 100 and the light combining unit 300 may be substantially identical to the image generation unit 100 and the light combining unit 300 described with reference to FIG. 2.

The driving unit 200 may control of a location of the image generation unit 100. The driving unit 200 may include second deformation units 212, a supporting unit 240, and a driving control unit 230. Each of the second deformation units 212 may be substantially the same as the first deformation unit 210 described with reference to FIG. 2 except for locations and a shape of the second deformation units 212.

The second deformation units 212 may be arranged between the supporting unit 240 and the image generation unit 100. Edge units of each of the second deformation units 212 may contact the supporting unit 240 and the image generation unit 100, respectively. A pair of the second deformation units 212 are depicted in FIG. 7, but it is an example. In some other embodiments, a single deformation unit 212 or more than three second deformation units 212 may be provided.

The driving control unit 230 is electrically connected to the second deformation units 212 and may apply an electrical signal to the second deformation units 212. For example, the driving control unit 230 may apply a voltage or a current to the second deformation units 212.

The driving control unit 230 of FIG. 7 may not apply an electrical signal to the second deformation units 212. The image generation unit 100 may be spaced apart from the light combining element 310 as much as a distance $Y_1$. The image generation unit 100 may emit virtual image light. As described with reference to FIGS. 5 and 6, the light combining unit 300 may form a virtual image 400. The virtual image 400 may be spaced apart from the light combining element 310 as much as a distance $X_1$.

Referring to FIG. 8, a temperature of the second deformation units 212 may be increased by applying an electrical signal to the second deformation units 212. For example, the electrical signal may be a voltage signal or a current signal. The voltage signal may be applied by the driving control unit 230. A length of each of the second deformation units 212 may be reduced. The image generation unit 100 may move away from the light combining element 310. The image generation unit 100 and the light combining element 310 may be spaced apart as much as a distance $Y_2$, which is greater than the distance $Y_1$. The degree of length change of each of the second deformation units 212 may be controlled by controlling the temperature of the second deformation units 212.

The virtual image 400 may move closer to the light combining unit 300. The virtual image 400 and the light combining element 310 may be spaced apart from each other as much as a distance $X_2$, which is less than the distance $X_1$.

Once the driving control unit 230 stops applying a voltage or current signal to the second deformation units 212, the temperature of the second deformation units 212 may be reduced, and the shape of second deformation units 212 and the location of the image generation unit 100 in FIG. 8 may return to the shape and the location as shown in FIG. 7. Specifically, a length of the second deformation units 212 may be re-increased. The image generation unit 100 may move closer to the light combining unit 300. For example, the image generation unit 100 may move from the light combining element 310 as much as the distance $Y_1$. The virtual image 400 may move away from the light combining unit 300. For example, the virtual image 400 and the light combining element 310 may be spaced apart from each other by the distance $X_1$.

The present disclosure may provide the see-through display device 12 configured to control a location of the virtual image 400. The location of the virtual image 400 may be continuously changed.

The present disclosure may provide the see-through display device 12 in which the driving unit 200 that moves the location of the image generation unit 100 is miniaturized and lightweight.

Figure 9:
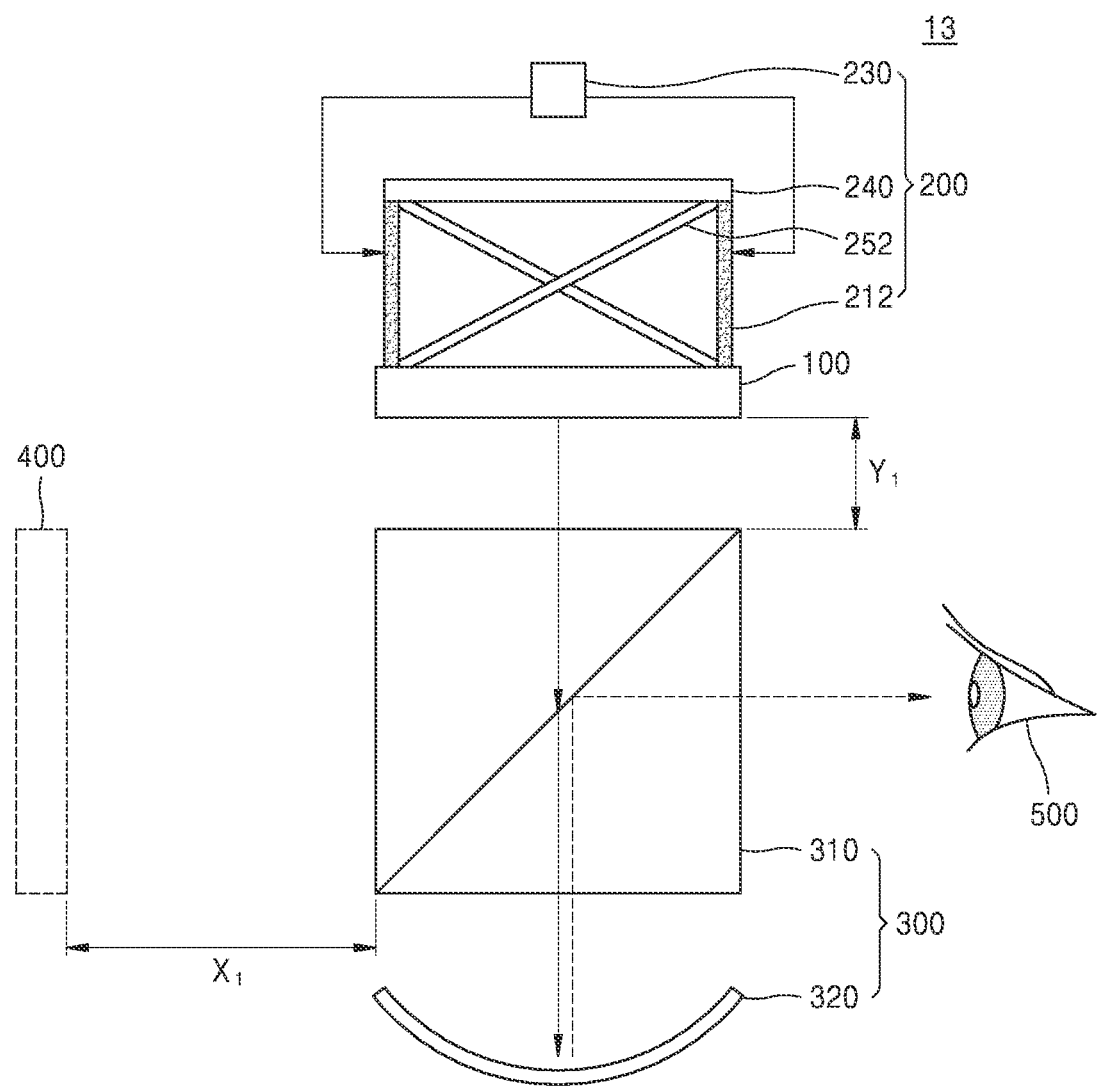
FIGS. 9 and 10 are conceptual drawings for explaining an operation of a see-through display device according to another example embodiment.
Figure 10:
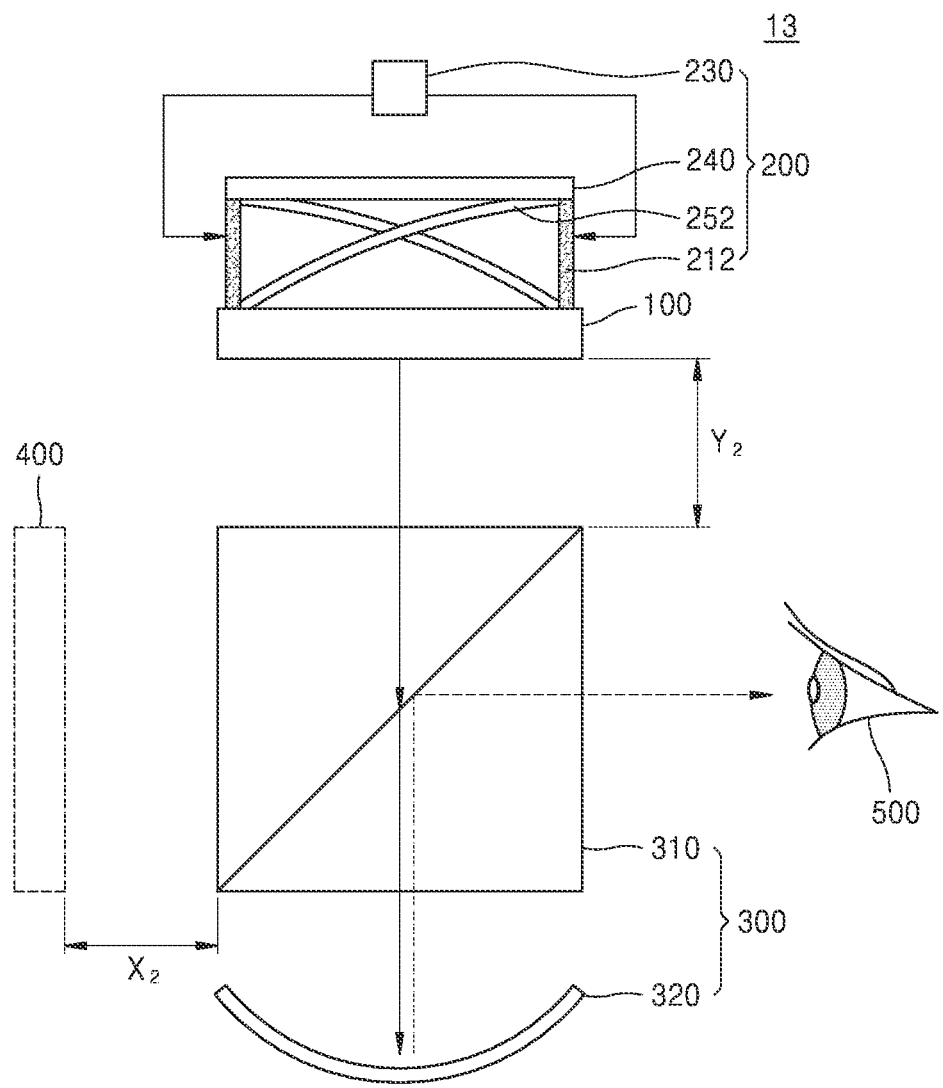

FIGS. 9 and 10 are conceptual drawings for explaining an operation of a see-through display device 13 according to another example embodiment. For convenience of explanation, descriptions substantially identical to the descriptions made with reference to FIGS. 7 and 8 will be omitted.

Referring to FIG. 9, the see-through display device 13 including an image generation unit 100, a driving unit 200, and a light combining unit 300 may be provided. The image generation unit 100 and the light combining unit 300 may be substantially the same as the image generation unit 100 and the light combining unit 300 described with reference to FIGS. 7 and 8.

The driving unit 200 may control a location of the image generation unit 100. The driving unit 200 may include second deformation units 212, a supporting unit 240, and first restoration units 252, and a driving control unit 230. The second deformation units 212, the supporting unit 240, and the driving control unit 230 may be substantially the same as the second deformation units 212, the supporting unit 240, and the driving control unit 230 described with reference to FIGS. 7 and 8.

The first restoration units 252 may be provided between the supporting unit 240 and the image generation unit 100. The first restoration units 252 may extend towards the image generation unit 100 from the supporting unit 240. The first restoration units 252 may extend to cross each other. Edge units of each of the first restoration units 252 respectively may contact the supporting unit 240 and the image generation unit 100. The first restoration units 252 may have elasticity. For example, each of the first restoration units 252 may include a bar including carbon. When the first restoration units 252 are bent, the first restoration units 252 may have restoration force to be restored to a state before bending.

The driving control unit 230 of FIG. 9 may not apply an electrical signal to the second deformation units 212. The image generation unit 100 may be spaced apart from the light combining element 310 as much as the distance $Y_1$. A virtual image 400 may be spaced apart from the light combining element 310 as much as the distance $X_1$.

Referring to FIG. 10, a temperature of the second deformation units 212 may be increased by applying an electrical signal to the second deformation units 212. For example, the electrical signal may be a voltage signal. The voltage signal may be applied by the driving control unit 230. A length of each of the second deformation units 212 may be reduced. The image generation unit 100 may move away from the light combining element 310. The image generation unit 100 and the light combining element 310 may be spaced apart from each other as much as a distance $Y_2$, which is greater than the distance $Y_1$. The degree of length change of each of the second deformation units 212 may be controlled by controlling the temperature of the second deformation units 212.

The virtual image 400 may be closer to the light combining unit 300. The virtual image 400 and the light combining element 310 may be spaced apart from each other as much as a distance $X_2$, which is less than the distance $X_1$.

The first restoration units 252 may be bent by the image generation unit 100 and the supporting unit 240. Accordingly, the first restoration units 252 may have a restoration force. The restoration force may act in a direction of increasing a distance between the image generation unit 100 and the supporting unit 240.

Once the driving control unit 230 stops applying a voltage or current signal to the second deformation units 212, the temperature of the second deformation units 212 is reduced and the length of the second deformation units 212 may be re-increased to return back to the state as shown in FIG. 9. Accordingly, the image generation unit 100 may be located closer to the light combining unit 300. For example, the image generation unit 100 may move towards the light combining element 310 by a distance $Y_1$ from the light combining element 310. The virtual image 400 may move away from the light combining unit 300. For example, the distance from the virtual image 400 to the light combining element 310 may be increased to the distance $X_1$.

The present disclosure may provide the see-through display device 13 configured to control a location of the virtual image 400. The location of the virtual image 400 may be continuously changed.

The present disclosure may provide the see-through display device 13 in which the driving unit 200 that moves the location of the image generation unit 100 is miniaturized and lightweight.

Figure 11:
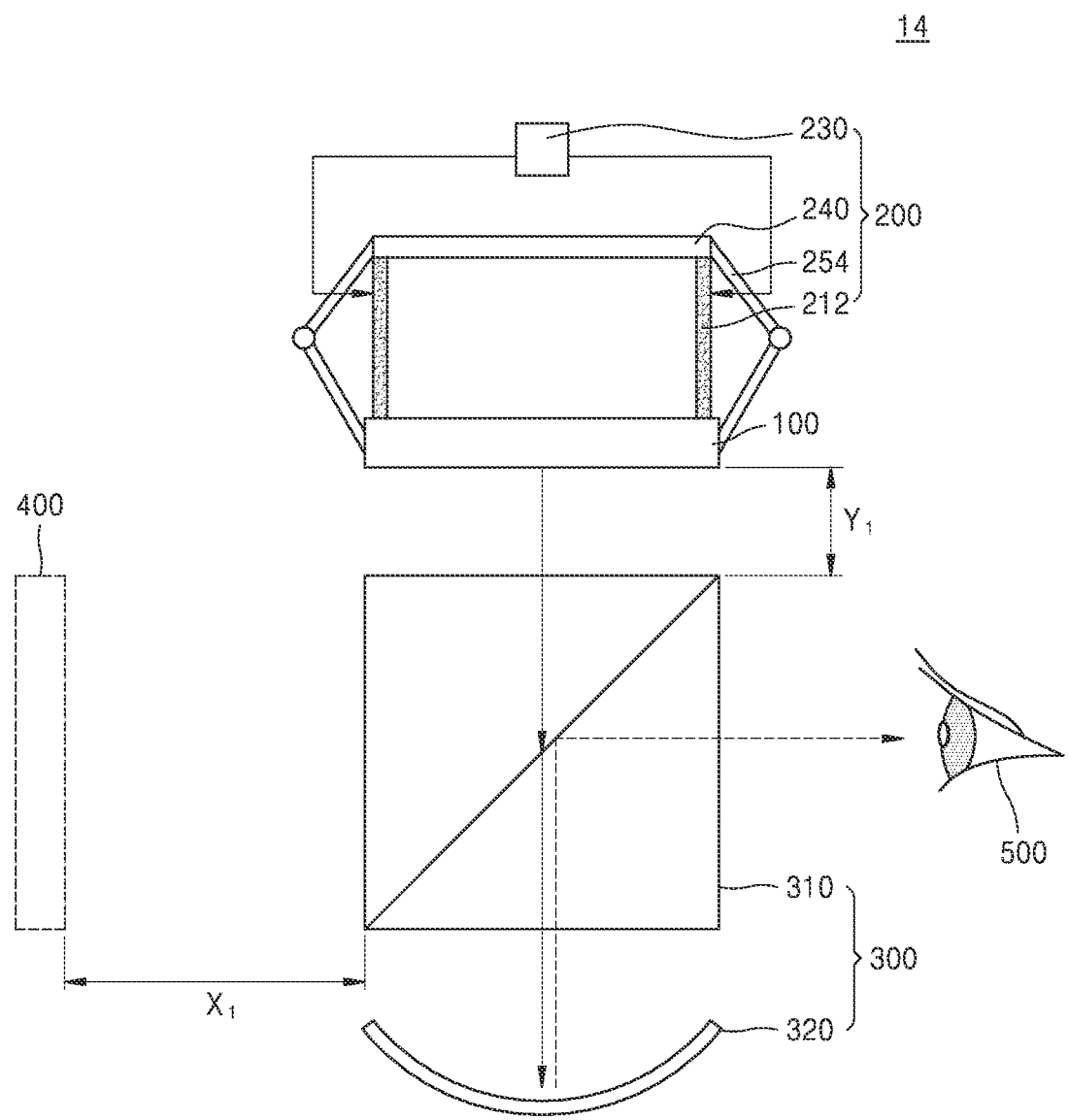
FIGS. 11 and 12 are conceptual drawings for explaining an operation of a see-through display device according to another example embodiment.
Figure 12:
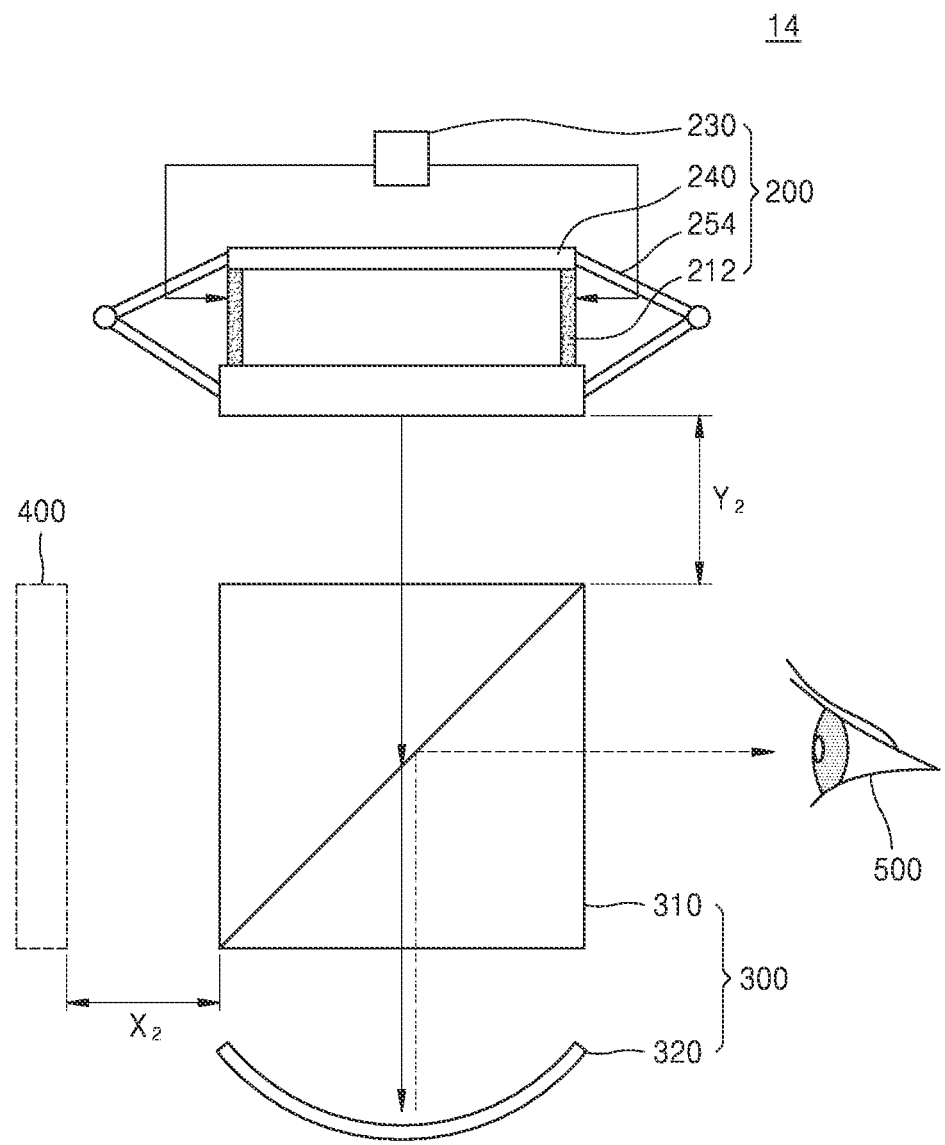

FIGS. 11 and 12 are conceptual drawings for explaining an operation of a see-through display device 14 according to example embodiments. For convenience of explanation, descriptions substantially identical to the descriptions made with reference to FIGS. 7 and 8 will be omitted.

Referring to FIG. 11, the see-through display device 14 including an image generation unit 100, a driving unit 200, and a light combining unit 300 may be provided. The image generation unit 100 and the light combining unit 300 are substantially the same as the image generation unit 100 and the light combining unit 300 described with reference to FIGS. 7 and 8.

The driving unit 200 may control a location of the image generation unit 100. The driving unit 200 may include second deformation units 212, a supporting unit 240, second restoration units 254, and a driving control unit 230. The second deformation units 212, the supporting unit 240, and the driving control unit 230 are substantially the same as the second deformation units 212, the supporting unit 240, and the driving control unit 230 described with reference to FIGS. 7 and 8.

The second restoration units 254 may be arranged between the supporting unit 240 and the image generation unit 100. The second restoration units 254 may include torsion springs. When the second restoration units 254 are distorted, the second restoration units 254 may have restoration force to be restored to a state before distortion. Edge units of each of the second restoration units 254 may contact the supporting unit 240 and the image generation unit 100, respectively.

The driving control unit 230 of FIG. 11 may not apply an electrical signal to the second deformation units 212. The image generation unit 100 may be spaced apart from the light combining element 310 as much as the distance $Y_1$. The virtual image 400 may be spaced apart from each other as much as the distance $X_1$.

Referring to FIG. 12, a temperature of the second deformation units 212 may be increased by applying an electrical signal to the second deformation units 212. For example, the electrical signal may be a voltage signal. The voltage signal may be applied by the driving control unit 230. A length of each of the second deformation units 212 may be reduced. The image generation unit 100 may move away from the light combining element 310. The image generation unit 100 and the light combining element 310 may be spaced apart as much as a distance $Y_2$ which is greater than the distance $Y_1$. The degree of length change of each of the second deformation units 212 may be controlled by controlling the temperature of the second deformation units 212.

The virtual image 400 may move closer to the light combining unit 300. The virtual image 400 and the light combining element 310 may be spaced apart from each other as much as a distance $X_2$, which is less than the distance $X_1$.

When the image generation unit 100 and the supporting unit 240 are closer to each other, the second restoration units 254 may be twisted. Accordingly, the second restoration units 254 may have a restoration force to be returned to an initial state. The restoration force may act in a direction of increasing the distance between the image generation unit 100 and the supporting unit 240.

Once the driving control unit 230 stops applying a voltage/current to the second deformation units 212, the temperature of the second deformation units 212 is reduced and the length of the second deformation units 212 may be increased to return back to the state as shown in FIG. 11. The image generation unit 100 and the light combining unit 300 may be closer to each other. For example, the image generation unit 100 may move towards the light combining element 310 by a distance $Y_1$ from the light combining element 310. The virtual image 400 may be spaced apart from the light combining unit 300. For example, the virtual image 400 may be spaced apart from the light combining element 310 by a distance $X_1$.

The present disclosure may provide the see-through display device 14 configured to control a location of the virtual image 400. The location of the virtual image 400 may be continuously changed.

The present disclosure may provide the see-through display device 14 in which the driving unit 200 that moves the location of the image generation unit 100 is miniaturized and lightweight.

The present disclosure provides a miniaturized and lightweight see-through display device.

The present disclosure provides a see-through display device configured to continuously change a focal distance.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A see-through display device comprising:
   an image generation unit that comprises a light source and is configured to emit a virtual image light;
   a light combining unit that comprises a mirror and a beam splitter and is configured to combine the virtual image light with an actual image light; and
   a driver comprising a deformation unit having a length that changes according to heat applied to the deformation unit, and a bridge disposed between the deformation unit and the image generation unit, and configured to control a distance between the image generation unit and the light combining unit through the deformation unit and the bridge.

2. The see-through display device of claim 1, wherein the length of the deformation unit is changed according to a temperature of the deformation unit.

3. The see-through display device of claim 2, wherein the driver further comprises a driving controller that controls the deformation unit, and the driving controller controls the temperature of the deformation unit by applying an electrical signal to the deformation unit.

4. The see-through display device of claim 2, wherein, as the length of the deformation unit decreases, the bridge moves the image generation unit closer to the light combining unit to decrease the distance between the image generation unit and the light combining unit.

5. The see-through display device of claim 2, wherein the deformation unit comprises a shape memory alloy (SMA).

6. The see-through display device of claim 1, wherein the deformation unit is wound around two opposing edges of the bridge so that the bridge has an arch shape.

7. The see-through display device of claim 6, wherein the two opposing edges of the bridge comprise recess regions, and the deformation unit is wound around the recess regions.

8. The see-through display device of claim 1, wherein the driver is further configured to apply heat to the deformation unit to change a degree of curvature of the bridge, and change the distance between the image generation unit and the light combining unit in accordance with the changed degree of curvature of the bridge.

9. A see-through display device comprising:
   an image generation unit that comprises a light source and is configured to emit a virtual image light;
   a light combining unit that comprises a mirror and a beam splitter and is configured to form a virtual image based on the virtual image light;
   a deformation unit that has a length changing according to heat applied to the deformation unit, and is configured to control a distance between the virtual image and the light combining unit; and
   a driving controller configured to control the length of the deformation unit to adjust the distance between the virtual image and the light combining unit.

10. The see-through display device of claim 9, wherein the driving controller is further configured to increase the distance between the virtual image and the light combining unit by reducing the length of the deformation unit.

11. The see-through display device of claim 10, further comprising a bridge disposed between the deformation unit and the image generation unit,
   wherein, as the length of the deformation unit decreases, the bridge moves the image generation unit closer to the light combining unit, and as the image generation unit is disposed closer to the light combining unit, the distance between the virtual image and the light combining unit is increased.

12. The see-through display device of claim 9, wherein the driving controller is further configured to increase the distance between the virtual image and the light combining unit by increasing the length of the deformation unit.

13. The see-through display device of claim 12, further comprising:
   a supporting unit spaced apart from the image generation unit with the deformation unit that is disposed between the supporting unit and the image generation unit; and
   a restoration unit arranged between the supporting unit and the image generation unit,
   wherein as the length of the deformation unit increases, the image generation unit is disposed closer to the light combining unit, and
   as the image generation unit is disposed closer to the light combining unit, the distance between the virtual image and the light combining unit is increased.

* * * * *